United States Patent
Kim et al.

(10) Patent No.: US 7,319,798 B2
(45) Date of Patent: Jan. 15, 2008

(54) APPARATUS GENERATING 3-DIMENSIONAL IMAGE FROM 2-DIMENSIONAL IMAGE AND METHOD THEREOF

(75) Inventors: Moon-Cheol Kim, Yongin (KR); Yung-jun Park, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 766 days.

(21) Appl. No.: 10/315,019

(22) Filed: Dec. 10, 2002

(65) Prior Publication Data

US 2003/0108251 A1 Jun. 12, 2003

(30) Foreign Application Priority Data

Dec. 11, 2001 (KR) ............... 2001-78255

(51) Int. Cl.
G06K 9/36 (2006.01)
(52) U.S. Cl. .............. 382/285; 382/154; 382/274; 382/285; 345/419; 345/653; 345/664
(58) Field of Classification Search ........... 382/154, 382/274, 275, 285, 167, 260, 295; 348/51; 345/653, 654, 664, 419, 589, 679
See application file for complete search history.

(56) References Cited

U.S. PATENT DOCUMENTS

| | | | | |
|---|---|---|---|---|
| 4,695,130 A | * | 9/1987 | Medina et al. ........... | 359/464 |
| 5,072,215 A | * | 12/1991 | Brotz ..................... | 345/6 |
| 5,136,390 A | * | 8/1992 | Inova et al. ............. | 348/383 |
| 5,408,537 A | * | 4/1995 | Major .................... | 382/141 |
| 5,500,684 A | * | 3/1996 | Uya ....................... | 348/592 |
| 5,737,031 A | * | 4/1998 | Tzidon et al. ........... | 348/587 |
| 5,831,623 A | * | 11/1998 | Negishi et al. ........... | 345/424 |
| 5,993,001 A | * | 11/1999 | Bursell et al. ........... | 351/212 |
| 6,016,150 A | * | 1/2000 | Lengyel et al. ........... | 345/426 |

(Continued)

FOREIGN PATENT DOCUMENTS

JP 08-249498 9/1996

(Continued)

OTHER PUBLICATIONS

Integrating Stereo and Shape from Shading; by Mostafa G.-H Mostafa, Sameh M. Yamany, and Aly A. Farag Computer Vision and Image Processing Lab, University of Louisville, Louisville, KY 40292. 1999.*

(Continued)

*Primary Examiner*—Yosef Kassa
(74) *Attorney, Agent, or Firm*—Staas & Halsey LLP (57) ABSTRACT

A 3-dimensional image is generated from an input 2-dimensional image based upon illuminative characteristics of the input image by filtering the 2-dimensional input image with filters of different orientations, outputting base shading images corresponding to the filters, extracting positive pixel values for each base shading image, calculating a difference between the pixel values of the input image and the extracted positive pixel values, calculating a median value of the calculated difference, selecting the filter to output a base shading image of smallest median, outputting a shading image by filtering the input image with the selected filter, combining the input image with the shading image and outputting the 3-dimensional image based upon the combined image. A previously selected filter for a preceding image can be considered when selecting a filter for a current image, enabling generation of 3-dimensional moving pictures.

21 Claims, 4 Drawing Sheets

U.S. PATENT DOCUMENTS

| | | | |
|---|---|---|---|
| 6,115,022 A * | 9/2000 | Mayer et al. | 345/418 |
| 6,252,608 B1 * | 6/2001 | Snyder et al. | 345/473 |
| 6,342,885 B1 * | 1/2002 | Knittel et al. | 345/424 |
| 6,346,967 B1 * | 2/2002 | Gullichsen et al. | 348/207.99 |
| 6,441,817 B1 * | 8/2002 | Gossweiler et al. | 345/422 |
| 6,487,432 B2 * | 11/2002 | Slack | 600/407 |
| 6,729,546 B2 * | 5/2004 | Roustaei | 235/462.45 |
| 6,757,888 B1 * | 6/2004 | Knutson et al. | 717/109 |
| 6,771,264 B1 * | 8/2004 | Duluk et al. | 345/426 |
| 7,013,040 B2 * | 3/2006 | Shiratani | 382/154 |

OTHER PUBLICATIONS

Tang Zesheng and Yuan Jun, "Visualization of *3D* Data Sets With Image Order Volume Rendering Techniques", Nov. 1994, vol. 17, No. 11.

Adobe Photoshop 5.0 User's Manual, "Adjusting a dark image taken at night with a lighting effect filter," pp. 121-122, 1998.

* cited by examiner

APPARATUS GENERATING 3-DIMENSIONAL IMAGE FROM 2-DIMENSIONAL IMAGE AND METHOD THEREOF

CROSS-REFERENCE TO RELATED APPLICATIONS

This application claims the benefit of Korean Application No. 2001-78255 filed Dec. 11, 2001, in the Korean Intellectual Property Office, the disclosure of which is incorporated herein by reference.

BACKGROUND OF THE INVENTION

1. Field of the Invention

The present invention generally relates to an apparatus generating a 3-dimensional image from a 2-dimensional image and a method thereof, and more particularly, the invention relates to an apparatus generating a 3-dimensional image by adding a shade in an outlining area of an input 2-dimensional image and a method thereof.

2. Description of the Related Art

The Photoshop, which is marketed by Adobe Systems and widely used around the world, adopts a method of filtering an image in RGB or CIE-Lab format to convert a 2-dimensional image into a 3-dimensional image. According to this method, a user has to manually make adjustments to the direction of illumination and the gains during conversion to a 3-dimensional image, and as a result, there has been a problem that characteristics of the true 2-dimensional image are not represented in the converted 3-dimensional image. Also, although the image can be represented in a 3-dimensional image after the filtering, it is only possible in a black and white image. Meanwhile, the GNU Image Manipulation Program, the graphic tool for LINUX that also employs the same method as that of the Photoshop, is only able to convert a 2-dimensional image in RGB format into the 3-dimensional image.

Rather than converting an original 2-dimensional image into the 3-dimensional image based on the illuminative effect of the original image, the above-mentioned graphic tools create new images from the original image as the user manually selects the illumination direction and gains. Therefore, in case of moving images (moving pictures) the illumination direction and gains have to be adjusted manually for each image, and further, the above-mentioned graphic tools are also not provided with functions like blurring and noise prevention. Accordingly, representation of moving pictures in 3-dimension can be very difficult and not practical using such typical methods.

SUMMARY OF THE INVENTION

The present invention has been made to overcome the above-mentioned problems of the related art. Accordingly, an object of the present invention is to provide an apparatus generating a 3-dimensional image from an original 2-dimensional still picture and a moving picture based on illuminative characteristics of the original picture, and a method thereof.

Additional objects and advantages of the invention will be set forth in part in the description which follows and, in part, will be obvious from the description, or may be learned by practice of the invention.

The present invention may be accomplished by an apparatus generating a 3-dimensional image from a 2-dimensional image comprising a generating unit generating a shading image of an input image by estimating a direction of illumination of the input image; and a combining unit combining the input image with the shading image and outputting the combined image in 3-dimensions.

According to an aspect of the invention, the generating unit includes a filtering unit filtering the input image with a plurality of filters of different orientations, and outputting resultant base shading images respectively corresponding to the filters; a positive value extracting unit extracting a positive pixel value for each of the base shading images; a subtracting unit calculating a difference between the pixel value of the input image and the positive pixel value extracted with respect to each of the base shading images; a median calculating unit calculating a median value of the difference that is calculated with respect to each of the base shading images; and filter selecting unit selecting the filter which outputs the base shading image of a smallest one of the median values, the filtering unit outputting/generating the shading image by filtering the input image with the filter that is selected by the filter selecting unit.

According to an aspect of the invention, the filtering unit includes a filter storing unit storing a plurality of filtering coefficients of different orientations; and a filter unit consecutively filtering the input images with respect to the plurality of the filtering coefficients and outputting the base shading images corresponding to the filtering coefficients, respectively.

According to an aspect of the invention, the generating unit further includes a filter adjusting unit maintaining a previously selected filter if the filter selected by the filter selecting unit with respect to a current input image is different from the previously selected filter and if a difference between a minimum median of the current input image and a minimum median of one or more preceding images is below a predetermined reference value, thereby allowing the apparatus to convert moving 2-dimensional images into moving 3-dimensional images by generating appropriate shading images corresponding to input 2-dimensional images.

According to an aspect of the invention, the filter adjusting unit includes a minimum median storing unit being input with the minimum medians of the current image and the preceding image and storing the input minimum medians; and a comparing unit outputting a control signal to maintain the previously selected filter if the filter selected by the filter selecting unit with respect to the current input image is different from the previously selected filter and if the difference between the minimum median of the current input image and the minimum median of one or more preceding images is below a predetermined reference value.

According to an aspect of the invention, an image quality improving unit is provided improving an image quality of the shading image. The image quality improving unit includes a noise eliminating unit eliminating a noise signal from the shading image; a blurring unit diffusing the shading image output from the eliminating unit; and a gain adjusting unit adjusting a shading correlation value of the shading image.

According to an aspect of the invention, the noise eliminating unit is a filter that eliminates the noise signal generated in a high frequency range of the shading images. The blurring unit is a 5-tap low-pass filter that diffuses the shading images in a horizontal and/or a vertical direction.

According to an aspect of the invention, a mapping unit is provided converting the 3-dimensional image that is not in a range of a displayable color gamut, so that the 3-dimensional image can be placed within the range of the displayable color gamut. The mapping unit converts a brightness and a chroma of the 3-dimensional image into a brightness and a chroma that are closest to an extreme color of the color gamut.

According to another embodiment, the invention may be accomplished by a method of generating a 3-dimensional image from a 2-dimensional image by generating a shading image with respect to an input 2-dimensional image by estimating a direction of illumination of the input image; and combining the input image with the shading image and outputting a resultant 3-dimensional image.

According to an aspect of the invention, generation of the shading image comprises filtering the input image with a plurality of filters of different orientations, and outputting resultant base shading images respectively corresponding to the filters; extracting a positive pixel value of each base shading image; calculating a difference between the pixel value of the input image and the positive pixel value extracted with respect to each base shading image; calculating a median value of the difference that is calculated with respect to each base shading image; selecting a filter which outputs the base shading image of a smallest one of the median values; and outputting/generating the shading image by filtering the input image with the selected filter.

According to an aspect of the invention, the shading image is output by consecutively filtering the input image with respect to the plurality of the filtering coefficients and outputting the base shading images corresponding to the filtering coefficients, respectively.

According to an aspect of the invention, generation of the shading image further comprises maintaining a previously selected filter if the selected filter with respect to a current input image is different from the previously selected filter and if a difference between a minimum median value of the current input image and a minimum median of one or more preceding images is below a predetermined reference value, thereby providing conversion of moving 2-dimensional images into moving 3-dimensional images by generating appropriate shading images corresponding to input 2-dimensional images.

According to an aspect of the invention, generation of the 3-dimensional image further comprises improving an image quality of the shading image, prior to the combining, by eliminating a noise signal from the shading image; diffusing the shading image output from the noise elimination; and adjusting a shading correlation value of the shading image. The noise elimination eliminates the noise signal generated in a high frequency range of the shading image.

According to an aspect of the invention, generation of the 3-dimensional image further comprises converting the 3-dimensional image that is not in a range of a displayable color gamut to a 3-dimensional image than can be within the range of displayable color gamut by converting a brightness and a chroma of the 3-dimensional image into a brightness and a chroma that are closest to an extreme color of the color gamut.

With the apparatus and method of generating a 3-dimensional image from a 2-dimensional image according to the present invention, based on illumination direction of an input 2-dimensional image, a shading image, which is generated by using different filters, is combined with the input image, and as a result, the 3-dimensional image is generated easily. Also, while selecting the filter corresponding to the illumination direction of the input image, since the previously selected filter is put into consideration, the conversion into 3-dimensional images of the moving picture becomes possible.

BRIEF DESCRIPTION OF THE DRAWINGS

The above-mentioned objects and other advantages of the present invention will be more apparent by describing the preferred embodiments of the present invention by referring to the appended drawings, in which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 1:
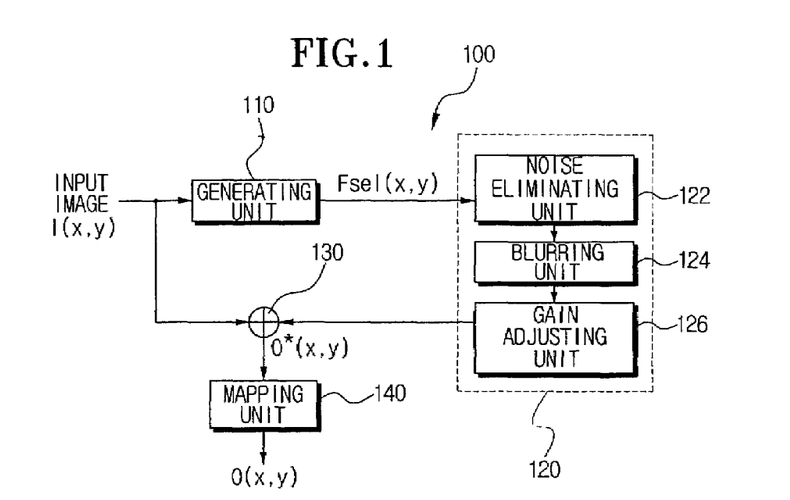
FIG. 1 is a block diagram showing an apparatus generating a 3-dimensional image from a 2-dimensional image according to an embodiment of the present invention.
Figure 6:
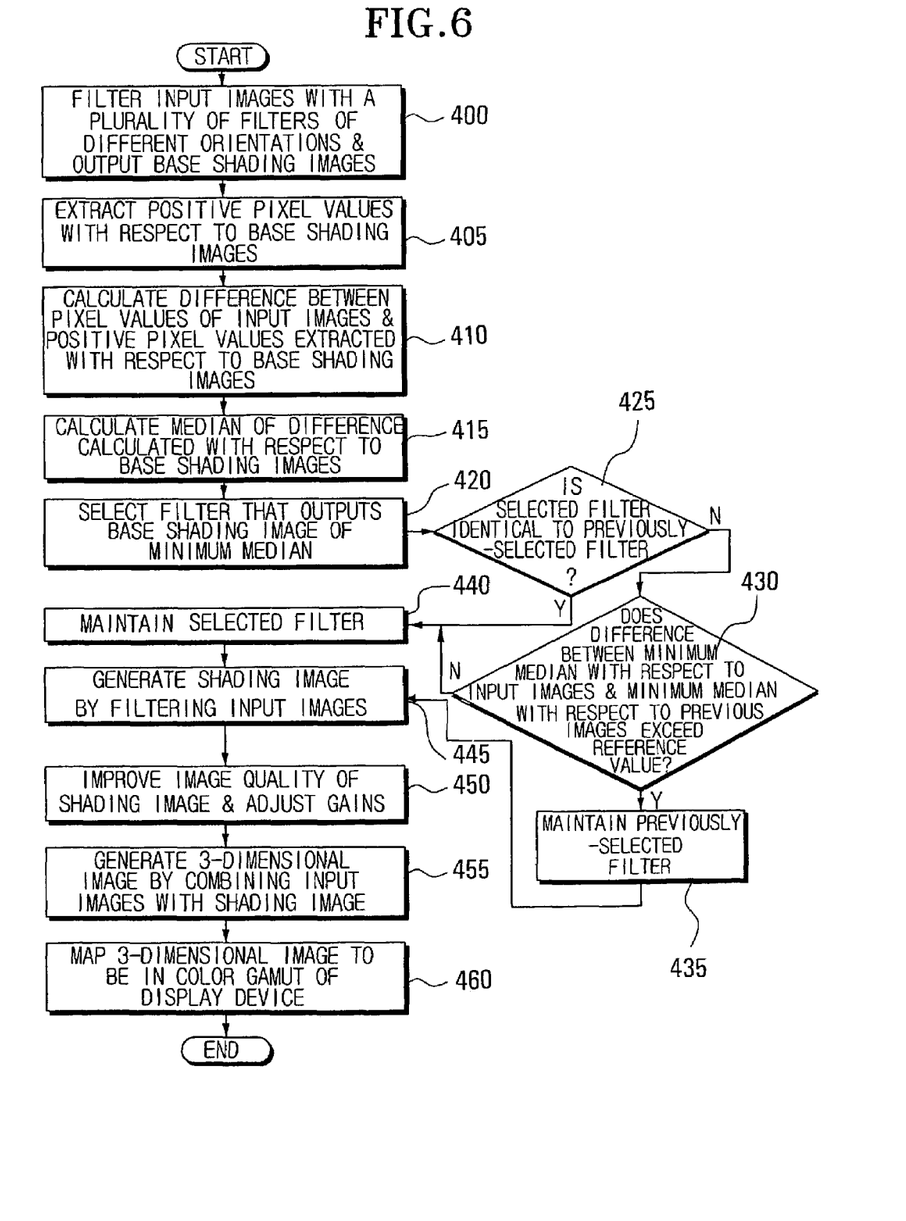
FIG. 6 is a flowchart showing a method of generating a 3-dimensional image from a 2-dimensional image according to an embodiment of the present invention.

FIG. 1 is a block diagram showing structure of an apparatus generating a 3-dimensional image from a 2-dimensional image according to an embodiment of the present invention, and FIG. 6 is a flowchart showing a method of generating the 3-dimensional image from the 2-dimensional image according to an embodiment of the present invention.

Figure 2:
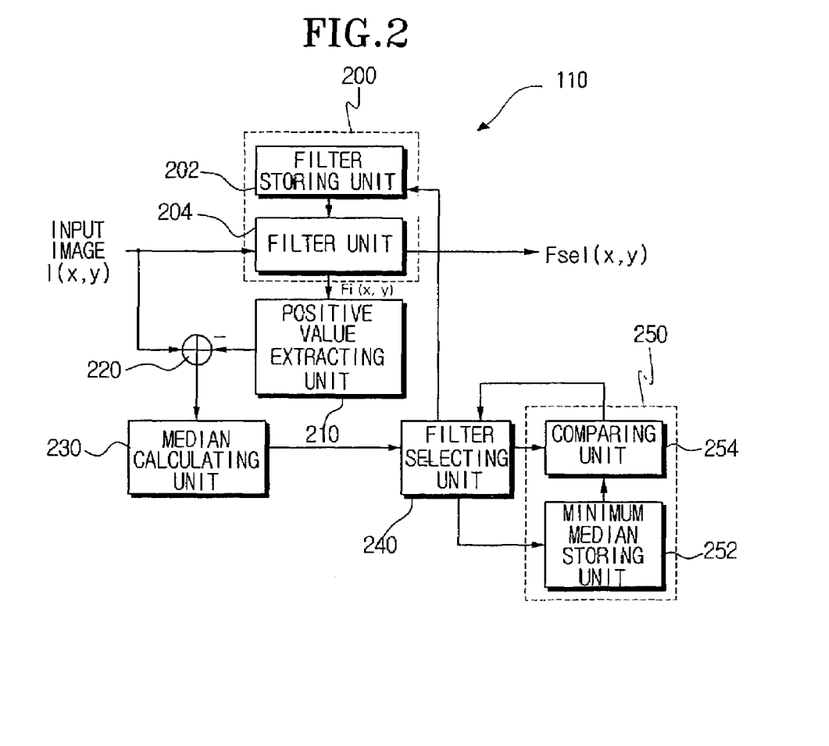
FIG. 2 is a block diagram showing the detailed structure of a generating unit provided in the apparatus shown in FIG. 1 and generating the 3-dimensional image from the 2-dimensional image according to an embodiment of the present invention.

Referring to FIGS. 1 2 and 6, the 3-dimensional image generating apparatus 100 according to the present invention includes a generating unit 110, an image quality improving unit 120, an adding unit 130 and a mapping unit 140. In particular, processes of the invention can be implemented/embodied in software and/or computing hardware. For example, apparatus 100 and described components thereof can be implemented as a computer system that includes storage, such as magnetic and optical discs, RAM, ROM, ASICs, etc., on which processes of the invention can be stored, the processes controlling the system and producing results according to the invention. The processes of the invention can also be distributed via, for example, downloading, over a network such as the Internet.

The generating unit 110 estimates direction of illumination from an input 2-dimensional image l(x,y) and generates a shading image Fsel(x,y) with respect to the input image l(x,y).

An example structure of the generating unit 110 is shown in FIG. 2 in greater detail. Referring to FIG. 2, the generating unit 110 includes a filtering unit 200, a positive value extracting unit 210, a subtracting unit 220, a median calculating unit 230, a filter selecting unit 240 and a filter adjusting unit 250.

Figure 3:
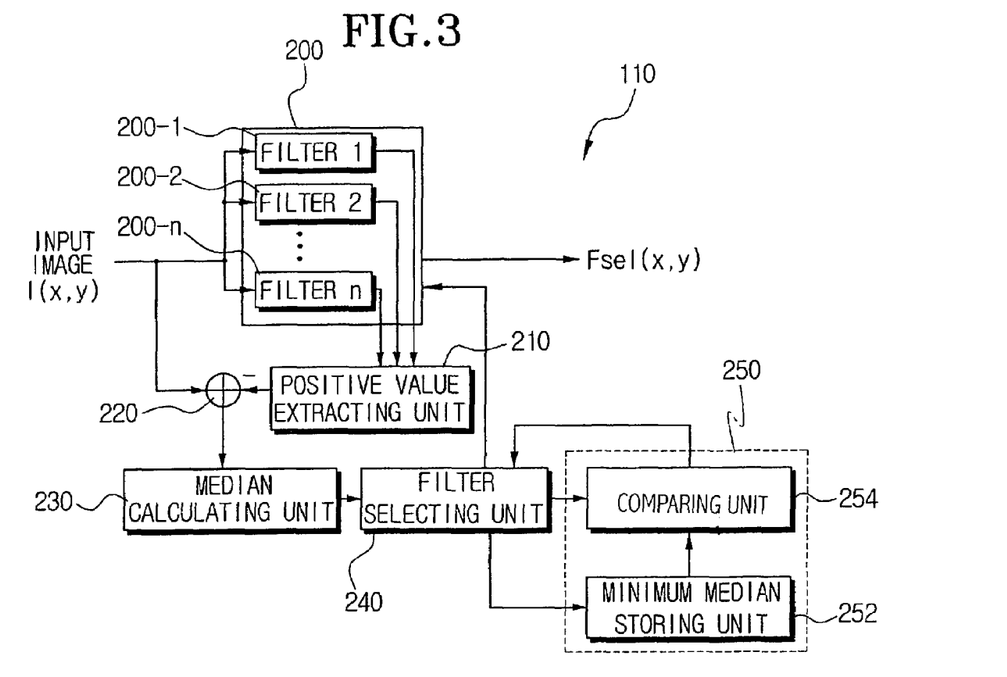
FIG. 3 is a block diagram showing detailed structure of a generating unit provided in the apparatus shown in FIG. 1 and generating the 3-dimensional image from the 2-dimensional image according to another embodiment of the present invention.

The filtering unit 200 filters the input image l(x,y) with respect to a plurality of filtering coefficients, and outputs base shading images respectively corresponding to the filtering coefficients (operation 400 in FIG. 6). The filtering unit 200 has a filter storing unit 202, and a filter unit 204. The filter storing unit 202 stores the plurality of filtering coefficients of different orientations. The filter unit 204 selects the filtering coefficients from the filter storing unit 202 consecutively, filters the input image, and outputs the base shading images. Alternatively, as shown in FIG. 3, the filtering unit 200 can also be comprised of filters 200-1~200-n of different orientations. In this case, a 2-dimensional image is input to the respective filters 200-1 through 200-n. The filters 200-1~200-n perform the filtering based on the filtering coefficients that are stored in the filter storage unit 202 (not shown in FIG. 3). As for the filters 200-1~200-n, filters like a band-pass filter or a high-pass filter are used. The filtering coefficients stored in the filter storing unit 202 are characteristic values of the respective filters 200-1~200-n. The operation of the other elements shown in FIG. 3 can typically be identical to the like elements in FIG. 2.

Figure 4:
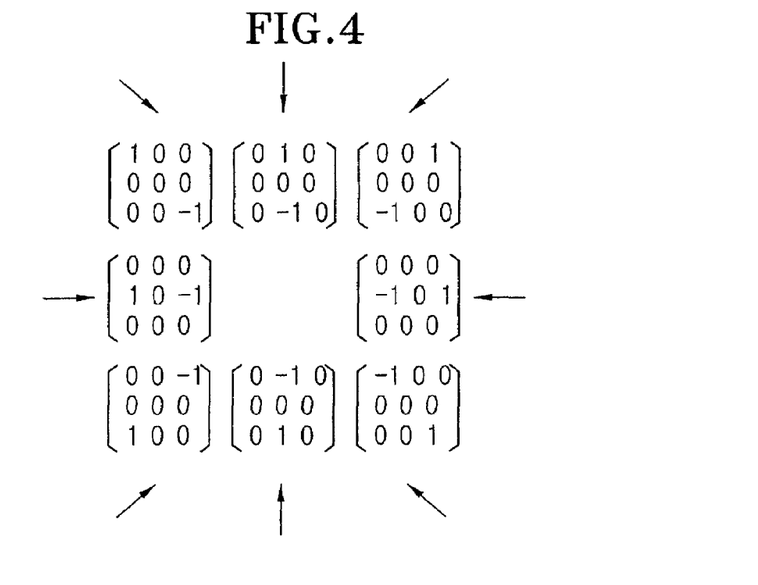
FIG. 4 is a view showing a filter coefficient of a convolution corresponding to a 2-dimensional band-pass filter and direction of illumination of each matrix.

FIG. 4 shows filtering coefficients of an example convolution filter corresponding to a 2-dimensional band-pass filter and direction of illumination with respect to each matrix. The illumination direction of a filtered 2-dimensional image can be determined according to symmetrical position of filtering constants (−1, 1). In a case that a filter is in a 3×3 dimension, filters of eight (8) orientations can be used, and filtering coefficients with respect to the eight (8) filters are stored in the filter storing unit 202.

To maximize realism of a converted 3-dimensional image from a 2-dimensional input image, a filter, which has same orientation as that of illumination direction contained in the input image, has to be selected. The filter unit 204 consecutively selects the filtering coefficients that are stored in the filter storing unit 202, and applies the selected filtering coefficient to the input image, thereby outputting a filtered signal Fi(x,y) (i.e., the base shading images). In a case that the filtering unit 200 is comprised of a plurality of filters 200-1~200-n, the incoming images can be input to the respective filters 200-1~200-n consecutively or simultaneously.

The relationship of a base shading image Fi(x,y) with respect to an input image l(x,y) filtered by a 3×3 convolution filter matrix Ei satisfies the following equation 1:

$$F_i(x, y) = \sum_{k=1}^{1} \sum_{l=1}^{1} E_i(k+1, l+1) \cdot I(x+k, y+l)$$ Equation 1 where, (x,y) is the position of a pixel in a vertical and horizontal axes.

The positive value extracting unit 210 outputs positive pixel values for the respective base shading images (operation 405 in FIG. 6). According to characteristics of the filtering coefficients or the filters 200-1~200-n being used, a base shading image can have the largest positive pixel values at the forward/rear or upper/lower outline of the base shading image (i.e., the largest negative signals are generated when the base shading image is subtracted from the input image). Generally, a base shading image closely matches the illumination direction of the input image when the input image corresponds to the positive pixel values of the base shading image that is generated by the filtering coefficients or the filters 200-1~200-n and a base shading image does not closely match the illumination direction of the input image when the base shading image has higher brightness signals than the input image (i.e., larger positive pixel values, thereby generating negative signal values when the based shading image is subtracted from the input image. In other words, if the energy of the signals, which are obtained by subtracting the corresponding base shading image from the pixel signals of the input image, is small, it is assumed that the filtering coefficient or the filter matches with the illumination direction of the input image more exactly/closely. Therefore, a shading image based upon illumination direction of an input image can be determined using the outline area of the input image.

The subtracting unit 220 calculates a difference between pixel values of the input image and positive pixel values that are extracted with respect to the base shading images (operation 410 in FIG. 6). An output signal $M_{dif}$ of the subtracting unit 220 is derived from the following equation 2:

$$M_{dif} = \sum_{x=1}^{P} \sum_{y=1}^{Q} (I(x, y) - F_{i,pos}(x, y))$$ Equation 2

The median calculating unit 230 calculates by the following equation 3 a median $M_I$ of the differences that are calculated with respect to the base shading images:

$$M_i = \frac{M_{dif}}{P \cdot Q}$$ Equation 3 where, P and Q respectively refer to number of pixels in the horizontal and vertical direction, and $F_{i,pos}$ refers to a signal output from the positive value extracting unit 210.

The filter selecting unit 240 selects a filtering coefficient or a filter that will output a base shading image with a smallest median $M_I$ (operation 420 in FIG. 6). The filtering coefficient or the filter selected by the filter selecting unit 240, is the filter coefficient or the filter that can closely match with the illumination direction of the input image. If the filtering unit 200 as shown in FIG. 2 is employed, the filter selecting unit 240 produces a signal to the filter unit 200 to select an index of the filter coefficient that matches with the illumination direction of the input image. If a filtering unit 200 as shown in FIG. 3 is employed, the filter selecting unit 240 also produces a signal to the filtering unit 200 to select the filter that closely matches with the illumination direction of the input image. In the latter's case, the filtering unit 200 is provided with either a multiplexer or a switch to produce one of the base shading signals output from the respective filters 200-1~200-n according to the control signal of the filter selecting unit 240. Then, a shading image $F_{sel}(x,y)$ can be generated by filtering the input image with the selected filter of the filter selection unit 240, the shading image being based upon the illumination direction of the input image.

In case of moving images, the generating unit 110 further includes a filter adjusting unit 250. Often times, during estimation of the illumination direction of the input image, a filter of orientation different from a previous frame is selected due to insertion of text or noise, even when the previous and the following frames are very similar to each other, and this can cause a more serious problem in moving pictures. Also, according to a type of the images, some observers even perceive jittering in the output images. The filter adjusting unit 250 is provided to adaptively deal with such a problem.

Therefore, the filter adjusting unit 250 determines whether to change the filtering coefficient or the filter when the filtering coefficient or the filter that is selected by the filter selecting unit 240 with respect to the current input image is different from the previously selected filtering coefficient or the filter. The filter adjusting unit 250 has a minimum median storing unit 252 and a comparing unit 254. The minimum median storing unit 252 stores a minimum median value $M_I$ with respect to the previous image that is input prior to the current image input from the filter selecting unit 240.

The comparing unit 254 compares the index of the filtering coefficient or the identifying information of the filter that is previously selected for the previous images with the index of the filtering coefficient or the identifying information of the filter that is selected for the current input image (operation 425 in FIG. 6). If the comparison result indicates a difference between the compared indexes and/or the identifying information, the comparing unit 254 determines whether the difference between the minimum medians $M_I$ of the current and previous input images exceeds a reference value (operation 430 in FIG. 6). If the difference between the minimum medians exceeds the reference value, indicative of a considerable amount of change in the input images, the filter selecting unit 240 selects the filtering coefficient or the filter that is selected for the current input image (operation 440 in FIG. 6). If the difference between the minimum medians is below the reference value, the previously selected filtering coefficient of the filter is maintained (operation 435 in FIG. 6).

At operation 445, the filtering unit 200 generates a shading image by filtering the input image with the filtering coefficient of the filter that is determined by the filter adjusting unit 250.

In FIG. 1, the quality improving unit 120 improves the image quality of the shading image $F_{sel}(x,y)$ output from the generating unit 110 (operation 450 in FIG. 6). The quality improving unit 120 has a noise eliminating unit 122, a blurring unit 124 and a gain adjusting unit 126.

In FIG. 1, noise eliminating unit 122 has a filter that eliminates a noise signal generated from a high frequency range of the shading image. The blurring unit 124 diffuses the shading signals (i.e., both the noise-free shading image and a not noise-free shading image) output from the noise eliminator 122 through a 2-dimensional blurring, or through a separate blurring in the horizontal and vertical directions. As for the blurring unit 124, a 5-tap low-pass filter 1, 2, 3, 2,1 can be employed, or other type of filters can also be used.

A shading image $F_{p(x,y)}$ having an improved image quality through the noise eliminating unit 122 and the blurring unit 124 would satisfy the following equation 4:

$$F_{p(x,y)} = \text{Blurring}[N\!P\text{map}[F_{sel}(x,y)]] \qquad \text{Equation 4}$$

In FIG. 1, the gain adjusting unit 126 adjusts a correlation value for the shading image of improved image quality $F_p(x,y)$. At operation 455, the combining unit 130 combines the input image with the improved shading image and outputs the resultant 3-dimensional image $O^*(x,y)$. The resultant image in 3-dimension output from the combining unit 130 satisfies the following equation 5:

$$O*(x, y) = \sum_{x=1}^{P}\sum_{y=1}^{Q}(I(x, y) + g \cdot F_{sel,lp,nri}(x, y)) \qquad \text{Equation 5}$$

where, g is a gain ratio.

Figure 5:
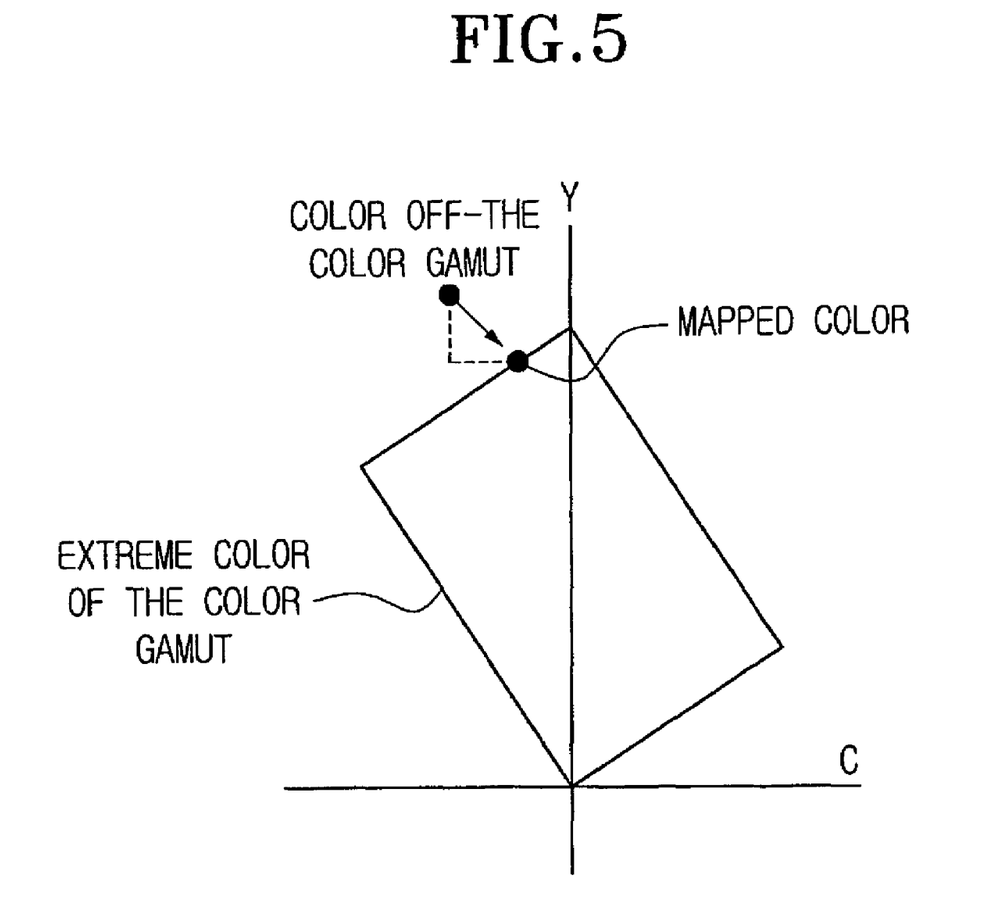
FIG. 5 is a view showing a principle of converting an input image in YCbCr format to be within a signal range of a display device while maintaining the same hue.

In FIG. 1, if the 3-dimensional image exceeds a displayable color gamut, at operation 460 the mapping unit 140 converts the 3-dimensional image $O^*(x,y)$ so that the image falls into the displayable color gamut. Also, the 3-dimensional image $O^*(x,y)$ output from the combining unit 130 sometimes exceeds a signal range of the display device. Therefore, if the 3-dimensional image $O^*(x,y)$ is clipped in this state, the image would be mapped into an undesired color, causing unbalance with respect to the color of the input image. Accordingly, if the 3-dimensional image $O^*(x,y)$ of the display device exceeds the signal range, the mapping unit 140 searches the most similar color to the input image among the extreme colors of the color gamut while maintaining the hue of the color, but appropriately adding or subtracting the brightness Dy and chroma Dc of color. FIG. 5 shows the principle of converting the 3-dimensional YCbCr type image to be within a signal range of a display device while maintaining the same hue.

The apparatus and method of generating 3-dimensional images from 2-dimensional images according to the present invention can be applied to all types of images like RGB, YCbCr, YIQ, YUV, CIE-Lab, CIE-LUV images, with an exception that the RGB image is applied with three (3) channels altogether. As for the other images, like the YCbCr image that is represented with the brightness and two colors Cb and Cr, however, the incoming image to the mapping unit 140 can be simply generated with a brightness signal of Y-component or L-component, with an additional requirement for the color components, for example, requirement for colors Cb and Cr for the YCbCr image during the mapping.

With the apparatus and method of generating 3-dimensional images from 2-dimensional images based on illuminative characteristics of input images, a shading image, which closely matches an illuminative characteristic, typically for example the illumination direction, of the input images is generated by using different filters, and the generated shading images are combined with the input images and as a result, 3-dimensional images with appropriate illumination direction are automatically generated easily. Also, while selecting the filter corresponding to the illumination direction of the input images, since the previously selected filter is put into consideration, conversion of moving pictures into 3-dimensional images becomes possible (i.e., the apparatus of the invention can automatically update the shading images based upon a difference in illumination direction of an input image and previous input images).

Although the preferred embodiments of the present invention have been described, it will be understood by those skilled in the art that the present invention is not limited to the described preferred embodiments, but various changes and modifications can be made within the spirit and scope of the present invention as defined by the appended claims and their equivalents.

What is claimed is:

1. An apparatus generating a 3-dimensional image from a 2-dimensional image, comprising:

a generator generating a shading image for a 2-dimensional input image by estimating a direction of illumination of the input image;

a combiner combining the input image with the shading image and outputting the combined image in 3-dimensions; and a mapper converting a 3-dimensional image not in a range of a displayable color gamut to a 3-dimensional image within the range of the displayable color gamut.

2. The apparatus of claim 1, wherein the mapper converts a brightness and a chroma of the 3-dimensional image into a brightness and a chroma that are closest to an extreme color of the color gamut.

3. An apparatus generating a 3-dimensional image from a 2-dimensional image, comprising:

a generator generating a shading image for a 2-dimensional input image by estimating a direction of illumination of the input image; and a combiner combining the input image with the shading image and outputting the combined image in 3-dimensions, wherein the generator comprises:

a filtering unit filtering the input image with filters of different orientations, and outputting base shading images respectively corresponding to the filters;

a positive value extractor extracting positive pixel values of each base shading image;

a subtractor calculating a difference between pixel values of the input image and the positive pixel values extracted for each base shading image;

a median calculator calculating a median value of the difference that is calculated with respect to each base shading image; and a filter selector selecting the filter to output the base shading image of a smallest one of the median values, wherein the filtering unit outputs the shading image by filtering the input image with the filter selected by the filter selecting unit.

4. The apparatus of claim 3, wherein the filtering unit comprises:

a filter storage storing filtering coefficients of the different orientations; and a filter unit consecutively filtering the input image with respect to the filtering coefficients and outputting the base shading images corresponding to the filtering coefficients, respectively.

5. The apparatus of claim 3, wherein the generator further comprises a filter adjuster maintaining a previously selected filter if the filter selected by the filter selector with respect to a current input image differs from the previously selected filter and if a difference between a minimum median value of the current input image and a minimum median value of one or more preceding images is below a predetermined reference value.

6. The apparatus of claim 5, wherein the filter adjustor comprises:

a minimum median storage storing minimum median values of the current image and the preceding images; and a comparator outputting a control signal to maintain the previously selected filter if the filter selected by the filter selecting unit with respect to the current input image is different from the previously selected filter and if the difference between the minimum median value of the current input image and the minimum median value of one or more of the preceding images is below the predetermined reference value.

7. An apparatus generating a 3-dimensional image from a 2-dimensional image, comprising:

a generator generating a shading image for a 2-dimensional input image by estimating a direction of illumination of the input image;

a combiner combining the input image with the shading image and outputting the combined image in 3-dimensions; and an image quality improver improving an image quality of the shading image, wherein the image quality improver comprises:

a noise eliminator eliminating a noise signal from the shading image;

a blurring unit diffusing both the noise-free shading image and a not noise-free shading image from the noise eliminator; and a gain adjustor adjusting a shading correlation value of the diffused shading image.

8. The apparatus of claim 7, wherein the noise eliminator is a filter that eliminates the noise signal generated in a high frequency range of the shading image.

9. The apparatus of claim 7, wherein the blurring unit is a 5-tap low-pass filter that diffuses the shading image in a horizontal and/or a vertical direction.

10. A method of generating a 3-dimensional image from a 2-dimensional image, comprising:

generating a shading image with respect to an input 2-dimensional image by estimating a direction of illumination of the input image;

combining the input image with the shading image and outputting a 3-dimensional image; and converting a 3-dimensional image not in a range of a displayable color gamut to a 3-dimensional image within the range of the displayable color gamut.

11. The method of claim 10, wherein conversion of the 3-dimensional image comprises converting a brightness and a chroma of the 3-dimensional image into a brightness and a chroma closest to an extreme color of the color gamut.

12. A method of generating a 3-dimensional image from a 2-dimensional image, comprising:

generating a shading image with respect to an input 2-dimensional image by estimating a direction of illumination of the input image; and combining the input image with the shading image and outputting a 3-dimensional image, wherein generation of the shading image further comprises:

filtering the input image with filters of different orientations, and outputting base shading images respectively corresponding to the filters;

extracting positive pixel values for each base shading image;

calculating a difference between pixel values of the input image and the positive pixel values extracted with respect to each base shading image;

calculating a median value of the difference calculated with respect to each base shading image;

selecting one of the filters to output the base shading image of a smallest one of the median values; and outputting the shading image by filtering the input image with the selected filter.

13. The method of claim 12, wherein output of the base shading images comprises consecutively filtering the input image with respect to the plurality of the filtering coefficients and outputting the base shading images corresponding to the filtering coefficients, respectively.

14. The method of claim 12, wherein the generation further comprises maintaining a previously selected filter if the selected filter selected with respect to a current input image is different from the previously selected filter and if a difference between a minimum median value of the current input image and a minimum median value of one or more preceding images is below a predetermined reference value.

15. A method of generating a 3-dimensional image from a 2-dimensional image, comprising:
   generating a shading image with respect to an input 2-dimensional image by estimating a direction of illumination of the input image;
   combining the input image with the shading image and outputting a 3-dimensional image; and
   improving quality of the shading image prior to combining the input image with the shading image,
   wherein improving of the image quality comprises:
   eliminating a noise signal from the shading image;
   diffusing both the noise-free shading image and a not noise-free shading image from the noise elimination; and
   adjusting a shading correlation value of the diffused shading image.

16. The method of claim 15, wherein elimination of the noise comprises eliminating the noise signal generated in a high frequency range of the shading image.

17. The method of claim 15, wherein diffuse of the shading image comprises diffusing the shading image in a horizontal and/or a vertical direction.

18. A system converting input 2-dimensional images to respective 3-dimensional images, comprising a programmed processor generating shading images based upon illuminative characteristics of the input images and by estimating a direction of illumination of the input images, combining the shading images with the input images, converting each combined image to a 3-dimensional image, and automatically adjusting noise, blur and/or gain of the 3-dimensional image.

19. A system converting input 2-dimensional images to respective 3-dimensional images, comprising a programmed processor generating shading images based upon illuminative characteristics of the input images and by estimating a direction of illumination of the input images, combining the shading images with the input images, converting each combined image to a 3-dimensional image, and automatically converting the 3-dimensional image to be within a range of a displayable color gamut.

20. A system converting input 2-dimensional images to respective 3-dimensional images, comprising a programmed processor generating shading images based upon illuminative characteristics of the input images and by estimating a direction of illumination of the input images, combining the shading images with the input images, converting each combined image to a 3-dimensional image, and automatically updating the shading images based upon a difference in illumination characteristic of an input image and previous input images.

21. A system converting input 2-dimensional images to 3-dimensional images, comprising:
   a programmed processor estimating illumination directions of input 2-dimensional images in any color format, automatically generating illuminatingly adjusted and gain adjusted colored 3-dimensional images based upon the estimated illumination directions of the input images, and converting ones of the generated 3-dimensional images not in a range of a displayable color gamut to a 3-dimensional images within the range of the displayable color gamut.

* * * * *